United States Patent
Kim

(10) Patent No.: US 9,383,765 B2
(45) Date of Patent: Jul. 5, 2016

(54) PEDAL SIMULATOR FOR ACTIVE BRAKE SYSTEM

(71) Applicant: MANDO CORPORATION, Pyeongtaek-si, Gyeonggi-do (KR)

(72) Inventor: Yoo-Sang Kim, Gunpo-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/308,394

(22) Filed: Jun. 18, 2014

(65) Prior Publication Data

US 2015/0101447 A1 Apr. 16, 2015

(30) Foreign Application Priority Data

Oct. 15, 2013 (KR) .................. 10-2013-0122329

(51) Int. Cl.
| | |
|---|---|
| *B60T 8/34* | (2006.01) |
| *G05G 1/40* | (2008.04) |
| *B60T 7/04* | (2006.01) |
| *G05G 1/44* | (2008.04) |
| *G05G 5/03* | (2008.04) |

(52) U.S. Cl.
CPC . *G05G 1/40* (2013.01); *B60T 7/042* (2013.01); *G05G 1/44* (2013.01); *G05G 5/03* (2013.01); *Y10T 74/20528* (2015.01)

(58) Field of Classification Search
CPC ...... B60T 8/409; B60T 8/4081; B60T 8/4086
See application file for complete search history.

(56) References Cited

U.S. PATENT DOCUMENTS

| | | | | |
|---|---|---|---|---|
| 5,038,564 | A * | 8/1991 | Horiuchi et al. | 60/555 |
| 2003/0205932 | A1 * | 11/2003 | Anderson | 303/114.1 |
| 2004/0181381 | A1 * | 9/2004 | Matsuhashi | 703/7 |
| 2005/0200199 | A1 * | 9/2005 | Kamiya et al. | 303/191 |
| 2007/0018498 | A1 * | 1/2007 | Nakazawa | 303/119.3 |
| 2008/0010985 | A1 * | 1/2008 | Miyazaki et al. | 60/565 |
| 2008/0223670 | A1 * | 9/2008 | Toyohira | B60T 7/042 188/152 |
| 2014/0069093 | A1 * | 3/2014 | Kim | 60/553 |
| 2014/0138888 | A1 * | 5/2014 | Kim | 267/140.13 |
| 2014/0230429 | A1 * | 8/2014 | Kim et al. | 60/553 |
| 2014/0360177 | A1 * | 12/2014 | Ryu et al. | 60/556 |
| 2014/0361473 | A1 * | 12/2014 | Ryu et al. | 267/140.2 |

FOREIGN PATENT DOCUMENTS

KR 2004-0049405 A 6/2004

* cited by examiner

*Primary Examiner* — Nicholas J Lane
(74) *Attorney, Agent, or Firm* — McDermott Will & Emery LLP

(57) ABSTRACT

Disclosed herein is a pedal simulator for an active brake system. According to an aspect of the present invention, the a pedal simulator for an active brake system, which is installed at a master cylinder to receive a hydraulic pressure corresponding to a driver's pedal force and to provide pedal feeling to the driver, includes a simulator block having an oil hole connected with the master cylinder at an upper portion thereof and having a bore therein to be in communication with the oil hole, a damping housing coupled to seal a lower end of the bore, a first reaction piston provided in the bore to be slidable by oil introduced from the master cylinder, a second reaction piston slidably provided in the bore and disposed under the first reaction piston to be spaced apart from the first reaction piston in a predetermined distance, a first damping member installed at the first reaction piston to be moved together with the first reaction piston, a second damping member installed at the damping housing and configured to provide a reaction force by pressing of the second reaction piston, and a reaction spring provided between the second reaction piston and the damping housing.

5 Claims, 5 Drawing Sheets

PEDAL SIMULATOR FOR ACTIVE BRAKE SYSTEM

CROSS-REFERENCE TO RELATED APPLICATION

This application claims the benefit of Korean Patent Application No. P2013-0122329, filed on Oct. 15, 2013 in the Korean Intellectual Property Office, the disclosure of which is incorporated herein by reference.

BACKGROUND

1. Field

Embodiments of the present invention relate to a pedal simulator, and more particularly, to a pedal simulator for an active brake system, which may enhance pedal feeling.

2. Description of the Related Art

Generally, an active brake system is a brake system in which, when a driver presses his/her foot down on a brake pedal, an electronic control unit (ECU) detects this state, drives a hydraulic pressure generating unit, and supplies a hydraulic pressure to a master cylinder, and thus a braking hydraulic pressure is transmitted to a wheel cylinder of each wheel, and a braking force is generated. In this active hydraulic control booster, a pedal displacement sensor detects a displacement of the brake pedal in a normal brake state, when the driver presses his/her foot down on the brake pedal. The ECU operates the hydraulic pressure generating unit, and controls a hydraulic fluid stored in a hydraulic fluid storage to be supplied to a boost chamber of the master cylinder, such that a pressure is formed in the master cylinder. The pressure formed in the master cylinder presses a piston of the master cylinder, thereby generating a braking hydraulic pressure. The braking hydraulic pressure is transmitted to the wheel cylinder, and generates a braking force.

At this time, if the pressure of the master cylinder is changed upon a regeneration braking, force corresponding to the pressure change is directly transmitted to the brake pedal and thus has a bad influence on pedal feeling. When the pedal feeling is deteriorated, there is a gap between the pedal feeling felt by the driver upon a braking operation and an actual pressing degree of a brake disk of a brake pad in the wheel cylinder, and thus the braking operation is excessively or insufficiently performed, and consumable components such as the brake pad should be frequently replaced, and it may have great influence on a safety accident of a vehicle, such as sudden braking and insufficient braking.

Therefore, conventionally, a pedal simulator is used at the active brake system to provide a reaction force to the brake pedal. As disclosed in Korean Patent No. 10-0657576, two springs as damping members are used in the pedal simulator to provide the reaction force according to a brake pedal force, and thus a simulator piston is damped. However, as illustrated in FIG. 1, since the two springs provide brake pedal feeling in only a simple primary linear type, desirable brake pedal feeling may not be provided.

Further, in a structure in which the two springs are arranged in series, when the reaction force is provided through a first spring in an initial low pedal force section and the piston is operated according to an installation load of the first spring, bump feeling is generated and thus the pedal feeling is deteriorated.

PRIOR ART DOCUMENTS

Patent Documents (Patent document) Korean Patent No. 10-0657576 (registered on Dec. 7, 2006)

SUMMARY

Therefore, it is an aspect of the present invention to provide a pedal simulator for an active brake system, which provides a low reaction force in an initial braking section to generate soft pedal feeling through a damping member, and provides a high reaction force in a last braking section to generate a nonlinear reaction force, thereby improving pedal feeling.

Additional aspects of the invention will be set forth in part in the description which follows and, in part, will be obvious from the description, or may be learned by practice of the invention.

In accordance with one aspect of the present invention, a pedal simulator for an active brake system, which is installed at a master cylinder to receive a hydraulic pressure corresponding to a driver's pedal force and to provide pedal feeling to the driver, includes a simulator block having an oil hole connected with the master cylinder at an upper portion thereof and having a bore therein to be in communication with the oil hole, a damping housing coupled to seal a lower end of the bore, a first reaction piston provided in the bore to be slidable by oil introduced from the master cylinder, a second reaction piston slidably provided in the bore and disposed under the first reaction piston to be spaced apart from the first reaction piston in a predetermined distance, a first damping member installed at the first reaction piston to be moved together with the first reaction piston, a second damping member installed at the damping housing and configured to provide a reaction force by pressing of the second reaction piston, and a reaction spring provided between the second reaction piston and the damping housing, wherein an insertion groove recessed upward to install the first damping member is formed at a lower end of the first reaction piston.

The second reaction piston may include a protruding portion configured to protrude toward the first reaction piston, and an extending portion configured to extend from a lower end of the protruding portion in an outer radial direction, and the protruding portion may be in contact with the first damping member so that the first damping member is disposed to be in a state of being pressed by a predetermined degree.

The damping housing may include a body portion disposed to be spaced apart from the second reaction piston in a predetermined distance and having a cylindrical shape of which an upper portion is opened and a receiving space therein, and a flange portion configured to extend from a lower outer circumferential surface of the body portion in a radial direction to support the reaction spring and to be assembled at the bore.

The second damping member may be formed to protrude toward the second reaction piston, and a pressing section in which the second damping member is pressed by the second reaction piston may be formed to have a longer length than a pressing section having a spaced distance between the first reaction piston and the second reaction piston.

A stopper may be further installed at a lower end of the damping housing to fix the damping housing to the simulator block.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
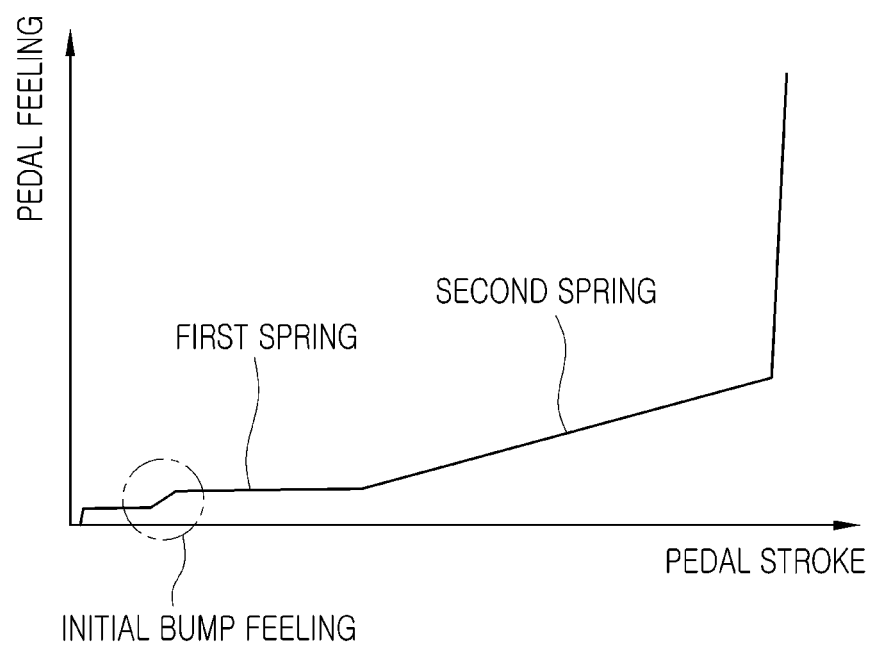
FIG. 1 is a graph illustrating a relationship between a pedal stroke and pedal feeling in a conventional pedal simulator.

Hereinafter, the embodiments of the present invention will be described in detail with reference to accompanying drawings. Here, the embodiments described below are just provided as exampled in order to convey the spirit of the present invention sufficiently to a person skilled in the art. Therefore, this invention is not limited to the embodiments disclosed below, but is capable of various modification, which would be apparent to a person skilled in the art. Further, in order to clearly describe the embodiments, parts that are not related to the description may be omitted in the drawings. In the drawings, sizes and shapes of construction elements shown in the drawings may be exaggeratedly illustrated for the sake of convenience and clarity. In this specification, the same reference numerals are given to the same or corresponding parts.

Figure 2:
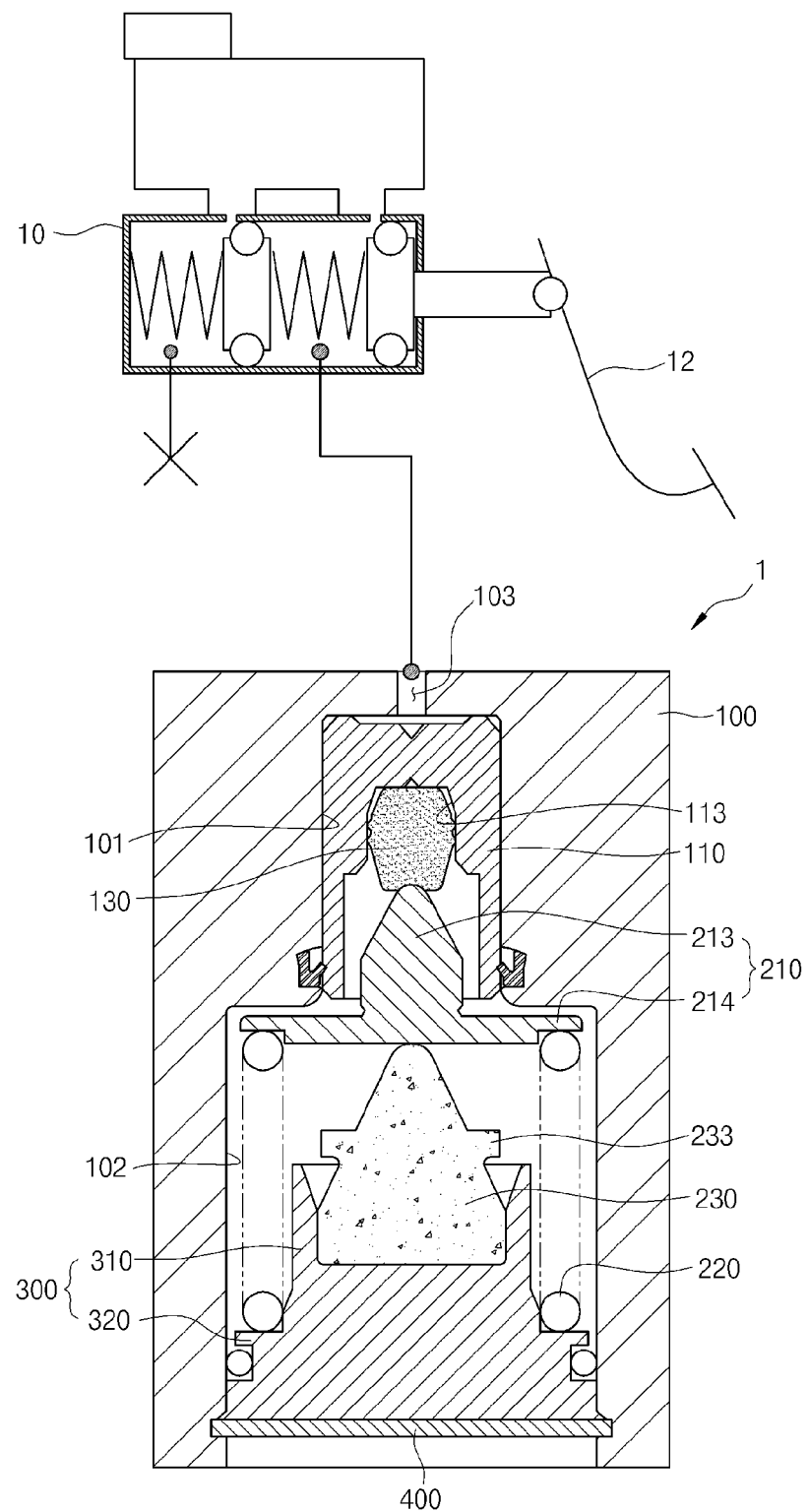
FIG. 2 is a view illustrating a pedal simulator for an active brake system according to one embodiment of the present invention.

FIG. 2 is a view illustrating a pedal simulator for an active brake system according to one embodiment of the present invention.

Referring to FIG. 2, the pedal simulator 1 for the active brake system according to one embodiment of the present invention includes a simulator block 100 installed at a master cylinder 10, which generates a braking hydraulic pressure by a brake pedal 12, to receive oil from the master cylinder 10, a first reaction part and a second reaction part installed at the simulator block 100 to provide pedal feeling, and a damping housing 300. At this time, the first and second reaction parts are disposed to have a serial structure at a bore formed in the simulator block 100.

An oil hole 103 through which the hydraulic pressure is introduced from the master cylinder 10 and a bore in communication with the oil hole 103 are formed at an upper portion of the simulator block 100. At this time, the bore formed at the simulator block 100 has a stepped shape having a first bore 101 in which the first reaction part is disposed and a second bore 102 in which the second reaction part is disposed. According to the drawing, the first bore 101 is formed to have a smaller diameter than that of the second bore 102.

The damping housing 300 is installed to seal a lower end of the bore. That is, the damping housing 300 is installed at a lower end of the second bore 102. Here, the damping housing 300 serves to support the second reaction part to be described later, and this will be described in detail below.

The first reaction part includes a first reaction piston 110 slidably installed at the first bore 101, and a first damping member 130 installed to be moved together with the first reaction piston 110.

The first reaction piston 110 is moved down, when the hydraulic pressure is introduced through the oil hole 103 located thereabove. At this time, an insertion groove 113 which is recessed upward is formed at a lower end of the first reaction piston 110. The first damping member 130 is inserted and installed into the insertion groove 113. The first damping member 130 is disposed to be spaced apart from a lower surface of the first reaction piston 110. Therefore, when the first reaction piston 110 is moved, the first damping member 130 is moved together with the first reaction piston 110.

The first damping member 130 is formed of a rubber material which may be elastically deformed, and serves to provide a reaction force to the brake pedal 12 by being in contact with and pressed to a second reaction piston 210 to be described later.

The second reaction part includes the second reaction piston 210 slidably provided at the second bore 102, a reaction spring 220 installed between the second reaction piston 210 and the damping housing 300 to be compressed by the second reaction piston 210, and a second damping member 230 installed at the damping housing 300 to be supported.

The second reaction piston 210 is provided to be spaced apart from the first reaction piston 110 in a predetermined distance. More specifically, the second reaction piston 210 includes a protruding portion 213 provided at a position opposed to the insertion groove 113 so as to protrude toward the first damping member 130, and an extending portion 214 formed to extend outward from a lower end of the protruding portion 213 in a radial direction.

As illustrated in the drawing, the protruding portion 213 protrudes toward the first bore 101 and is in contact with the first damping member 130. That is, the first damping member 130 is in a state of being pressed to a predetermined degree by the protruding portion 213. This is to secure a return ability that the first reaction piston 110 may be returned to its original position by the first damping member 130 formed of the rubber material, when braking is released. And this is also to provide soft pedal feeling at the initial braking stage.

The extending portion 214 is disposed in the second bore 102, and serves to support an upper end of the reaction spring 220. At this time, the extending portion 214 may be provided to press the second damping member 230, and thus formed to have a flat shape.

The reaction spring 220 has a coil shape to provide the reaction force to the brake pedal 12. That is, the reaction spring 220 is compressed when the second reaction piston 210 is moved, and provides the reaction force. At this time, the reaction spring 220 is formed to have a greater elastic coefficient than that of the first damping member 130. Therefore, the first reaction piston 110 is pushed, and then the second reaction piston 210 is pushed.

The second damping member 230 is formed of a rubber material which may be elastically deformed, and serves to provide a reaction force to the brake pedal 12 by being in contact with and pressed to the second reaction piston 210. The second damping member 230 is installed in a receiving space of a body portion 310 formed in the damping housing 300, which will be described later. At this time, as illustrated in the drawing, the second damping member 230 is provided to protrude from an opened upper portion of the body portion 310 and to be in contact with the second reaction piston 210, but is not limited thereto. The second damping member 230 may be provided to be in contact with the second reaction piston 210 after the second reaction piston 210 is moved downward in a predetermined distance.

Meanwhile, the second damping member 230 has wing parts 233 configured to protrude from an outer circumferential surface in a radial direction. The wing parts 233 formed around an upper portion of the second damping member 230 are provided to be located between the second reaction piston 210 and the upper end of the damping housing 300 when the second damping member 230 is elastically deformed, such that the upper end of the damping housing 300 is not in contact with the second reaction piston 210 (referring to FIG. 4). That is, the second reaction piston 210 formed of a metallic material is prevented from being in contact with the damping housing 300, and thus the pedal force is prevented from being sharply increased.

The damping housing 300 is assembled to the simulator block 100 to be spaced apart from the second reaction piston 210 in a predetermined distance. As described above, the damping housing 300 is assembled to a lower end of the second bore 102 to be spaced apart from the second reaction piston 210 in the predetermined distance. More specifically, the damping housing 300 includes a body portion 310 which is opened upward and has a cylindrical shape, and a flange portion 320 extending from a lower outer circumferential surface of the body portion 310 in a radial direction.

The body portion 310 has a receiving space therein, and the second damping member 230 is installed in the receiving space. At this time, an upper portion of an inner surface of the body portion 310 may be formed to have an inclined surface which is inclined outward to be easily elastically deformed when the second damping member 230 is elastically deformed.

The flange portion 320 is assembled to the lower end of the second bore 102, and a lower end of the reaction spring 220 is supported on an upper surface of the flange portion 320. The body portion 310 and the flange portion 320 are integrally formed.

Meanwhile, a stopper 400 is installed at a lower end of the damping housing 300 so that the damping housing 300 is stably fixed to the simulator block 100. That is, the stopper 400 is fixed to the simulator block 100 and serves to support the damping housing 300.

As described above, in the pedal simulator 1, since the first and second reaction parts are provided to have the serial structure, the first reaction piston 110 is pushed, and then the second reaction piston 210 is pushed. That is, the first reaction piston 110 is pushed, and the first damping member 130 is pressed and elastically deformed by the second reaction piston 210, and thus the reaction force is primarily provided. Then, when the lower end of the first reaction piston 110 is in contact with the second reaction piston 210 and presses the second reaction piston 210, the reaction force is secondarily generated by the reaction spring 220. And the second reaction piston 210 compresses the reaction spring 220, is in contact with the second damping member 230, and presses the second damping member 230, and thus a tertiary reaction force is generated from the reaction spring 220 and the second damping member 230. At this time, as illustrated in the drawing, when the second damping member 230 is provided in a state of being in contact with the second reaction piston 210, the secondary reaction force and the tertiary reaction force are generated together.

As described above, the pedal simulator 1 is formed to be divided into a first reaction section A (the initial braking section) corresponding to the movement of the first reaction piston 110 disposed in the first bore 101 and a second reaction section B (the last braking section) corresponding to the movement of the second reaction piston 210 disposed in the second bore 102, thereby providing stable pedal feeling. At this time, a pressing section corresponding to a distance between the first reaction piston 110 and the second reaction piston 210 is referred to as a first pressing section A, and a pressing section pressed by the second reaction piston 210 is referred to as a second pressing section B. A length of the second pressing section B is formed to be greater than that of the first pressing section A. That is, a distance in which the reaction spring 220 and the second damping member 230 are pressed by the second reaction piston 210 is formed to be long, such that a nonlinear section is maximized, and thus the pedal force is prevented from being sharply increased. Therefore, transition of the soft pedal feeling may be embodied after a knee point similar to that in a conventional brake system.

And an operation state of the pedal simulator for the active brake system as described above is described with reference to FIGS. 3 and 4.

Figure 3:
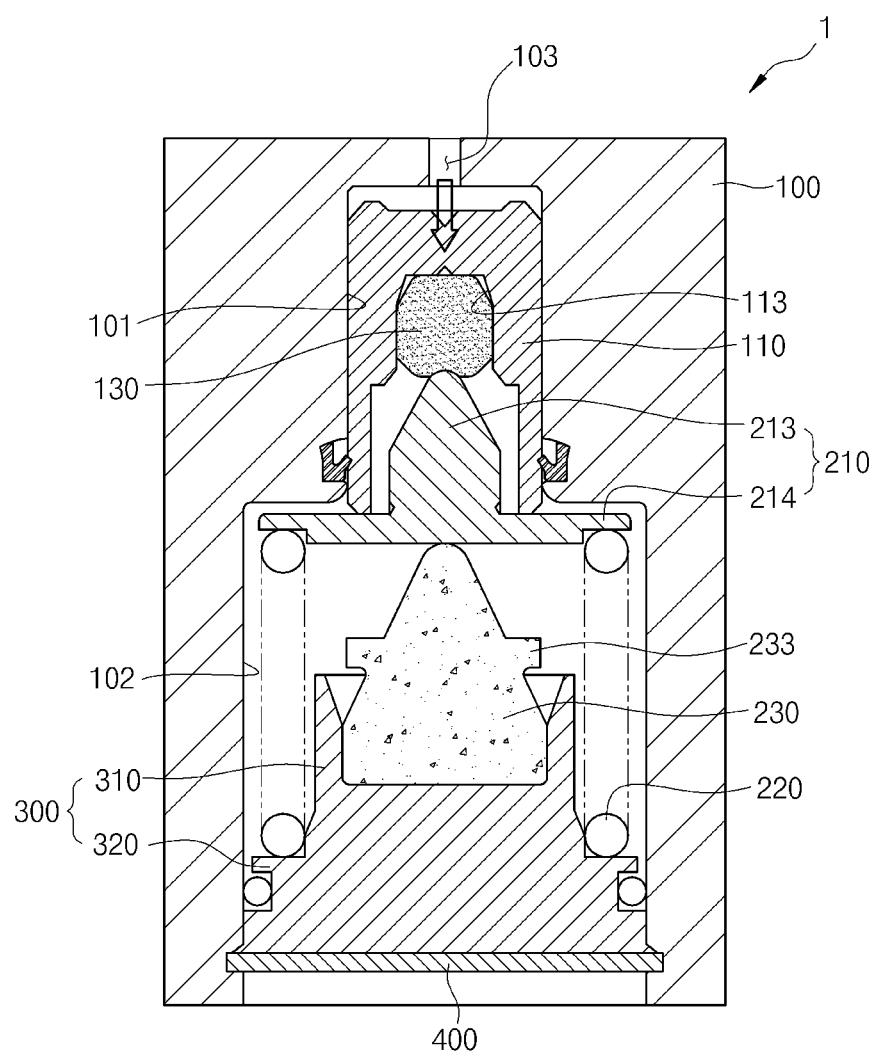
FIGS. 3 and 4 are views illustrating an operation state of the pedal simulator for the active brake system according to one embodiment of the present invention.

Firstly, as illustrated in FIG. 3, when the hydraulic pressure is introduced from the master cylinder (referring to 10 of FIG. 2) through the oil hole 103 of the simulator block 100, the first reaction piston 110 is pushed, and the first damping member 130 installed at the first reaction piston 110 is moved together. Therefore, the first damping member 130 is pressed by the protruding portion 213 of the second reaction piston 210, and thus the reaction force is generated. At this time, since the first damping member 130 is in the state of being pressed to the predetermined degree by the protruding portion 213, the soft pedal feeling is provided at the first pressing section A as the initial braking section.

Figure 4:
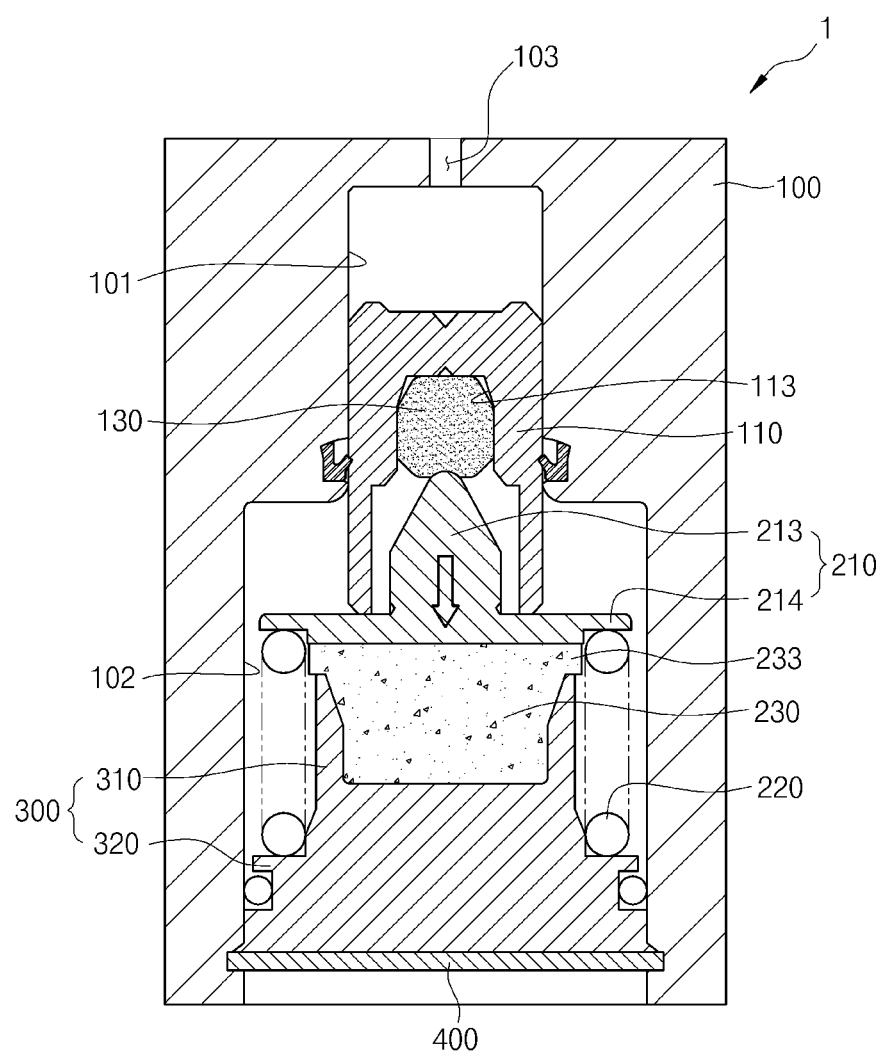

Then, as illustrated in FIG. 4, the first reaction piston 110 is moved, and the lower end of the first reaction piston 110 is in contact with the second reaction piston 210, and the second reaction piston 210 is pushed, compresses the reaction spring 220, presses the second damping member 230, and thus the reaction force is generated. In this situation, if the second reaction piston 210 is further pushed, the wing parts 233 are located and pressed between the second reaction piston 210 and the damping housing 300 according to an elastic deformation of the second damping member 230, and the high reaction force is generated. At this time, when the second damping member 230 located under the second reaction piston 210 is spaced apart from the second reaction piston 210 in the predetermined distance, the second damping member 230 is pressed after the generation of the secondary reaction force compressing the reaction spring 220, and thus the tertiary reaction force may be generated.

Thus, in an initial stroke section (referring to A of FIG. 5) of the brake pedal (referring to 12 of FIG. 2), the low reaction force is provided by the reaction force of the first damping member 130, and in a last stroke section (referring to B of FIG. 5) of the brake pedal 12, the reaction forces of the reaction spring 220 and the second damping member 230 are added, and thus the high reaction force may be provided to the brake pedal 12.

Meanwhile, when the second damping member 230 is pressed and elastically deformed, the second damping member 230 is easily elastically deformed by the inclined surface formed at the inner side of the upper portion of the damping housing 300, and covers the upper end of the damping housing 300, and also the wing parts 233 formed at the second damping member 230 are located between the second reaction piston 210 and the damping housing 300 to prevent a contact therebetween.

Figure 5:
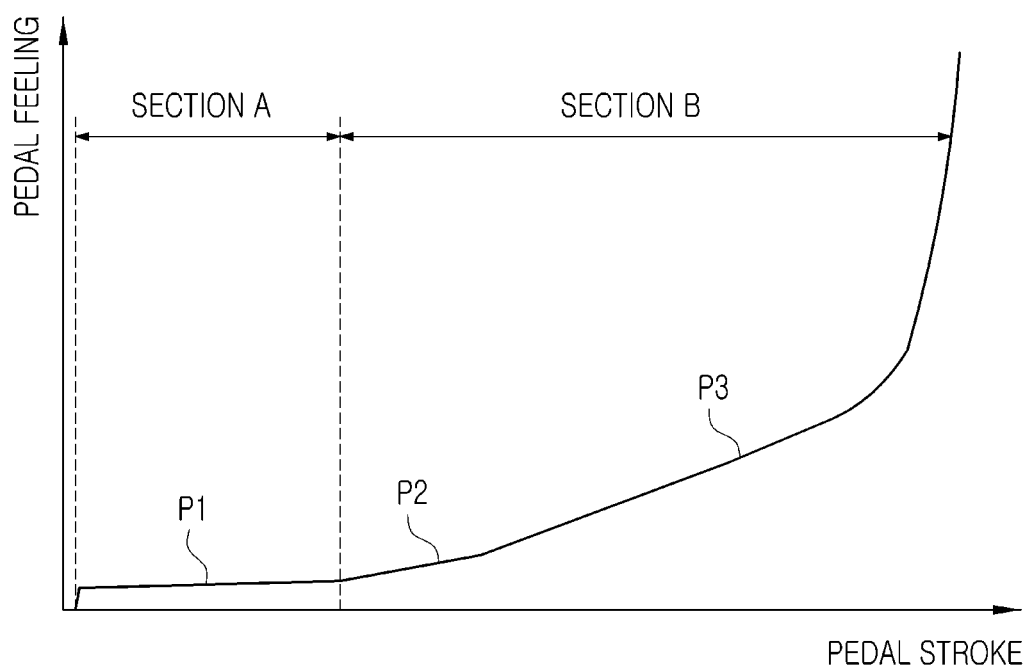
FIG. 5 is a graph illustrating a relationship between a pedal stroke and pedal feeling in the pedal simulator for the active brake system according to one embodiment of the present invention.

FIG. 5 is a graph illustrating a relationship between the pedal stroke and the pedal feeling in the pedal simulator for the active brake system according to one embodiment of the present invention.

As described above, the first and second reaction parts are provided in series at the pedal simulator 1, and the second damping member 230 disposed at the second bore 102 has the long length to be pressed. Therefore, as illustrated in FIG. 5, the reaction is increased in a secondary curve type which provides the reaction force similar to that in the pedal simulator of the conventional brake system, not in a linear type (referring to FIG. 1), and thus preferable pedal feeling may be provided. Further, since the reaction force is provided using the first damping member 130 to prevent a piston bumping phenomenon (referring to FIG. 1) occurring when the reaction force by the spring is provided in the initial braking section, the soft pedal feeling may be provided.

At this time, a section P1 is a section in which the first damping member is pressed and the reaction force is generated, a section P2 is a section in which, when the second reaction piston 210 is spaced apart from the second damping member 230, the reaction force generated by compressing the reaction spring 220 and the reaction force generated by pressing the first damping member 130 are added, and a section P3 is a section in which the reaction force of the first damping member 130 and the reaction spring 220 and the reaction force generated by pressing the second damping member 230 are added. That is, the section P1 is the initial section A, the sections P2 and P3 are the last section B of the pedal stroke. In other words, as illustrated in the graph, the sections P2 and P3 are formed so that the nonlinear section is maximized, and thus an inclination thereof is smoothly increased, even when the inclination is sharply increased by the high reaction force.

As a result, the pedal simulator 1 for the active brake system according to the present invention is configured to provide the soft pedal feeling through the first damping member 130 without the bump feeling at the initial braking stage and also to provide the pedal feeling according to the pressing degree of the second damping member 230 at the last braking stage, such that the reaction force sharply increased in the last braking section may be smoothly increased. Therefore, the brake pedal feeling may be enhanced.

The pedal simulator for the active brake system according to the present invention is provided to have the secondary damping structure in which the low reaction force is provided through the first damping member formed of the rubber material in the initial braking section, and thus the bump feeling of the piston due to the conventional spring can be removed, and the soft pedal feeling can be provided.

Further, in the last braking section, the high reaction force is provided through the spring and the second damping member to generate the nonlinear reaction force similar to the pedal feeling of the conventional brake system, thereby enhancing the pedal feeling.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pedal simulator for an active brake system, which is installed at a master cylinder to receive a hydraulic pressure corresponding to a driver's pedal force and to provide pedal feeling to the driver, comprising:
    a simulator block having an oil hole connected with the master cylinder at an upper portion thereof and having a bore therein to be in communication with the oil hole;
    a damping housing coupled to seal a lower end of the bore;
    a first reaction piston provided in the bore to be slidable by oil introduced from the master cylinder;
    a second reaction piston slidably provided in the bore and disposed under the first reaction piston to be spaced apart from the first reaction piston in a predetermined distance;
    a first damping member installed at the first reaction piston to be moved together with the first reaction piston;
    a second damping member installed at the damping housing and configured to provide a reaction force by pressing of the second reaction piston; and
    a reaction spring provided between the second reaction piston and the damping housing,
    wherein an insertion groove recessed upward to install the first damping member is formed at a lower end of the first reaction piston, and
    the second damping member has a wing part protruding radially from an outer circumferential surface at an upper portion of the second damping member in a non-deformed state of the second damping member,
    wherein the wing part is configured to prevent direct contact between the second reaction piston and an upper end of the damping housing when the second damping member is elastically deformed.

2. The pedal simulator according to claim 1, wherein the second reaction piston comprises a protruding portion configured to protrude toward the first reaction piston, and an extending portion configured to extend from a lower end of the protruding portion in an outer radial direction, and
    the protruding portion is in contact with the first damping member so that the first damping member is disposed to be in a state of being pressed by a predetermined degree.

3. The pedal simulator according to claim 1, wherein the damping housing comprises a body portion disposed to be spaced apart from the second reaction piston in a predetermined distance and having a cylindrical shape of which an upper portion is opened and a receiving space therein, and a flange portion configured to extend from a lower outer circumferential surface of the body portion in a radial direction to support the reaction spring and to be assembled at the bore.

4. The pedal simulator according to claim 1, wherein the second damping member is formed to protrude toward the second reaction piston, and a pressing section in which the second damping member is pressed by the second reaction piston is formed to have a longer length than a pressing section having a spaced distance between the first reaction piston and the second reaction piston.

5. The pedal simulator according to claim 1, wherein a stopper is further installed at a lower end of the damping housing to fix the damping housing to the simulator block.

* * * * *